United States Patent
Fhima et al.

(10) Patent No.: US 12,470,636 B1
(45) Date of Patent: Nov. 11, 2025

(54) EFFICIENT SOFTWARE RELEASE MANAGEMENT AND DEPLOYMENT

(71) Applicant: Morgan Stanley Services Group Inc., New York, NY (US)

(72) Inventors: Ira Fhima, New York, NY (US); Poornima Vasudevan, Bengaluru (IN); Susmitha Kunisetty, Bengaluru (IN); Anish Singh, Bengaluru (IN); Baisakhi Mitra, Bengaluru (IN); Lovely Kumari, Bengaluru (IN); Konika Preethi Tupili, Bengaluru (IN); Himanshu Kumar, Bengaluru (IN)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/972,815

(22) Filed: Dec. 6, 2024

(51) Int. Cl.
G06F 15/177 (2006.01)
H04L 67/00 (2022.01)
H04L 67/55 (2022.01)
H04L 67/566 (2022.01)

(52) U.S. Cl.
CPC ............. H04L 67/34 (2013.01); H04L 67/55 (2022.05); H04L 67/566 (2022.05)

(58) Field of Classification Search
None
See application file for complete search history.

(56) References Cited

U.S. PATENT DOCUMENTS

| | | | |
|---|---|---|---|
| 8,677,315 B1 * | 3/2014 | Anderson | G06F 8/60 717/124 |
| 10,585,656 B1 | 3/2020 | Das et al. | |
| 11,157,253 B1 | 10/2021 | Shteyman et al. | |
| 2003/0079132 A1 * | 4/2003 | Bryant | G06F 21/575 717/176 |
| 2006/0168575 A1 | 7/2006 | Bhatt et al. | |
| 2006/0168581 A1 | 7/2006 | Goger et al. | |
| 2008/0040455 A1 | 2/2008 | Macleod et al. | |
| 2008/0098386 A1 | 4/2008 | Leung et al. | |
| 2009/0144730 A1 | 6/2009 | Chen et al. | |
| 2009/0320019 A1 | 12/2009 | Ellington et al. | |
| 2011/0126192 A1 * | 5/2011 | Frost | G06F 8/61 717/178 |
| 2012/0159468 A1 | 6/2012 | Joshi et al. | |

(Continued)

Primary Examiner — Phuoc H Nguyen
(74) Attorney, Agent, or Firm — Duane Morris LLP

(57) ABSTRACT

A method performed by one or more computers for managing software distribution, comprising assigning computing devices into batches based on a plurality of criteria, including a software environment and a virtual machine cluster; obtaining a deployment schedule that associates each software release with a deployment date for each batch; generating a release scope list that indicates, for each computing device, an associated user account and a local deployment time from the deployment schedule; resolving conflicts in the deployment schedule to generate an updated deployment schedule based on the release scope list; deploying one or more software releases to the computing devices; transmitting a script to one or more of the computing devices, instructing determining a current status of any user account logged into the computing device and a message display type based on the current status, the message enabling installation of a software release of the one or more software releases.

15 Claims, 12 Drawing Sheets

(56) References Cited

U.S. PATENT DOCUMENTS

2014/0331225 A1* 11/2014 Helander ............ H04L 63/1433
718/1
2016/0239280 A1  8/2016 Scheiner et al.
2018/0060066 A1  3/2018 Rihani et al.
2023/0153093 A1  5/2023 Rajagopalan et al.

* cited by examiner

Distribution Release Scheduling System 140

| | | |
|---|---|---|
| Release 320A | Batch 221A | Deployment Date 430A |
| Release 320A | Batch 221B | Deployment Date 430B |
| Release 320A | Batch 221C | Deployment Date 430C |
| Release 320A | Batch 221D | Deployment Date 430D |
| Release 320B | Batch 221E | Deployment Date 430E |
| Release 320B | Batch 221F | Deployment Date 430F |

Distribution Communication System 150

Release Contact List 450A

| Networked Device 160A | User Account 360A | Local Deployment Time 333A | Deployment Date 430A |
| Networked Device 160B | User Account 360B | Local Deployment Time 333B | Deployment Date 430A |
| Networked Device 160C | User Account 360C | Local Deployment Time 333C | Deployment Date 430A |
| Networked Device 160D | User Account 360D | Local Deployment Time 333D | Deployment Date 430A |
| Networked Device 160E | User Account 360E | Local Deployment Time 333E | Deployment Date 430A |
| Networked Device 160F | User Account 360F | Local Deployment Time 333F | Deployment Date 430A |
| Networked Device 160G | User Account 360G | Local Deployment Time 333G | Deployment Date 430B |
| Networked Device 160H | User Account 360H | Local Deployment Time 333H | Deployment Date 430B |

EFFICIENT SOFTWARE RELEASE MANAGEMENT AND DEPLOYMENT

TECHNICAL FIELD

The present disclosure relates to computing device management, and more particularly to improving efficiency in deploying software across diversified computing assets, deploying hardware storage to diversified computing assets, and recovery of physical computing devices.

BACKGROUND

Today, software deployments are utilized to keep computing devices across an organization operating in synchronization. Software deployments can be performed to enable information technology (IT) upgrades across the organization. Doing so reduces the probability of certain computing devices having settings, capabilities, or security risks other computing devices in the organization do not, thereby reducing inter-functional issues between organizational devices, as well as presenting a generally stable and uniform platform for operation and security. Software deployments also facilitate logging which computing devices utilize what software, settings, and versions, allowing improved auditing and support efficiency when technical issues in organizational computing devices arise.

In some cases, when the number of computing devices are large, or the computing devices have varied profiles, software deployments are batched into groups: for example, updating all on-site desktop computers, then on-site virtual machines, then off-site laptop computers. Batching allows the software deployment process to be managed, allows for auditing the success of the software deployment and, if necessary, allows for rolling back some software releases while minimally impacting the overall organization.

However, at institutions with a large number of computing devices, software deployments are a largely manual process of determining which computing devices require what software releases, scheduling when those releases should be deployed to those particular computing devices, batching software deployments into sensible groups, notifying users that their computing devices will be impacted, and confirming with users that their computing devices were not negatively affected after the deployment. Further, as the number of computing devices grows and reflects underlying organizational relationships, the criteria for requiring a particular software release on a particular computing device may change between the creation of batches and the actual deployment of the software, requiring increasing efforts to ensure that the list of computing devices to receive a particular software release is correct from the time of the software deployment batch creation, through the notifications to the users, and until after the software deployment is complete. The conventional approach of determining computing devices targeted for the release, batching computing devices, notifying and re-notifying users, and concurrently updating which computing devices are targeted manually, is inadequate. Therefore, it would be helpful to improve the software deployment process.

In addition, the management of computing devices themselves can be inefficient. Ownership of computing devices can change from time to time. At dynamic organizations, computing devices may be physically forgotten or re-appropriated, and ownership information can be missing or outdated as user accounts are updated. This is especially problematic at secure organizations such as financial institutions, as the computing devices must be accounted for in order to reduce even the appearance of non-compliance with insider trading regulations. The conventional approach of identifying computing devices after an end user has left the organization, and having an individual user physically obtain the computing device and personally report the recovery of the device, is inadequate. Therefore, it would be helpful to improve efficiency and overall hardware recovery rates.

Relatedly, computing devices are often organized into teams or groups with shared objectives. Those objectives may be facilitated by sharing storage space, either for logistical or for accounting purposes. A computing device may have access to multiple shared storage spaces. These shared storage spaces may have a capacity that is materially higher than the amount allocated or used, for a materially long period of time. Consequently, shared storage spaces may be combined onto one or more physical devices, and as allocation of the shared storage space approaches its allocation limit or capacity, the shared storage space may be increased and/or moved to physical devices with additional capacity. The allocated shared storage space should be monitored judiciously, as a lapse in increasing capacity or a lapse in notifying end users that their group is running out of storage can result in systems utilizing that storage running out of space, failing, and irrevocably losing essential data. The conventional approach of manually identifying shared storage spaces approaching their allocation, calculating how much larger the allocation should be, and determining whether the storage space can utilize the existing physical devices or requires a move, is inadequate. Therefore, it would be helpful to improve efficiency and reduce risks of storage overruns.

SUMMARY

The appended claims may serve as a summary of the invention.

BRIEF DESCRIPTION OF THE DRAWINGS

Example embodiments will now be described by way of non-limiting example with reference to the accompanying drawings, in which:

FIG. 4 illustrates a relational diagram depicting an exemplar distribution release scheduling system of an exemplar software distribution system.

FIG. 5 illustrates a relational diagram depicting an exemplar distribution communication system of an exemplar software distribution system.

DETAILED DESCRIPTION OF CERTAIN EMBODIMENTS

Figure 1:
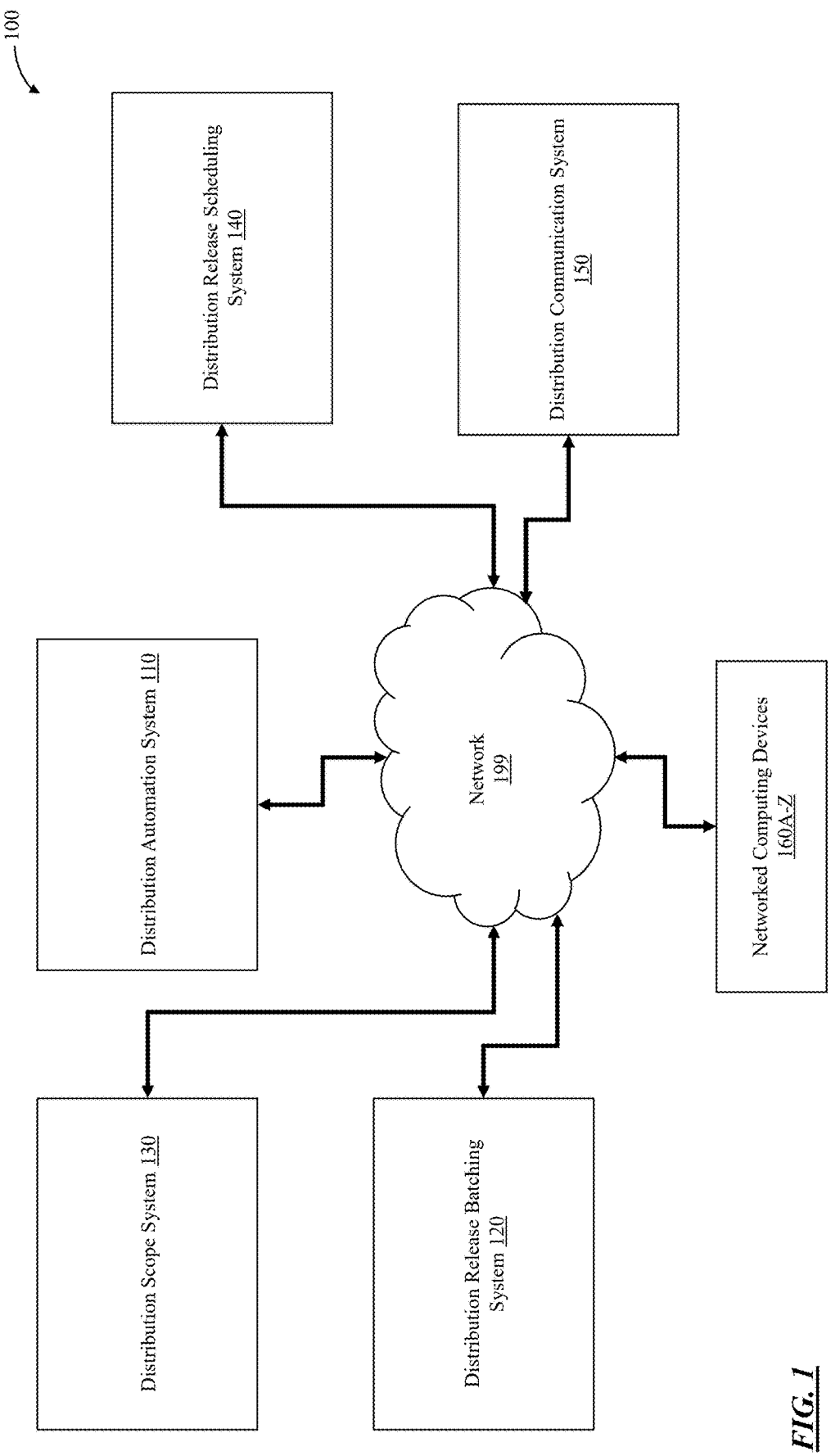
FIG. 1 illustrates an example networked system including an exemplar software distribution system in which various embodiments may be practiced.

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1. General Overview

A system or method for automating software distributions. The system or method includes creating a software release, and creating a deployment schedule for the software release. The system or method includes aligning the deployment schedule with one or more existing deployment schedules. Alignment may include combining one or more releases in order to reduce computing device downtime, or may include distributing one or more releases over one or more release windows to isolate issues introduced by any of the one or more releases. The system or method includes updating release batch criteria, which may include creating initial batch criteria in order to facilitate sorting computing devices or users out of a catch-all batch into particularized batches. The system or method includes periodically updating membership of computing devices into a release batch based in part on the release batch criteria, and periodically updating membership of user accounts into the release batch based in part on the release batch criteria. The system or method includes associating one or more release batches including the release batch with one or more deployment schedule entries of the deployment schedule. The system or method includes for each batch associated with the one or more deployment schedule entries of the deployment schedule: messaging the user accounts with membership in the release batch, messaging the computing devices with membership in the release batch, and updating the computing devices with a software of the software release.

A system or method for automating reclamation of computing hardware. The system or method includes identifying a user account associated with a conclusion of a term with an organization. The system or method includes determining whether the user account is pre-term or post-term. The system or method includes transmitting a first message to a pre-term responsible account regarding the computing hardware and the conclusion of the term. The system or method includes creating an account ticket associated with the computer hardware and assigned to a post-term responsible account. The system or method includes determining whether the computer hardware is located. The system or method includes creating an escalated ticket associated with the computer hardware and assigned to a reclamation account.

A system or method for automating group storage allocations. The system or method includes identifying a storage allocation exceeding an allocation threshold. The system or method includes determining an updated allocation threshold. The system or method includes determining whether a present pool associated with the storage allocation includes a storage device capacity sufficient to accommodate the updated allocation threshold. The system or method includes determining an allocation increase value. The system or method includes, in response to a sufficient storage device capacity, transmitting an increase request, the increase request including the allocation increase value and an identifier of the storage allocation. The system or method includes, in response to an insufficient storage device capacity, transmitting a move request, the move request including the allocation increase value and an identifier of the storage allocation.

The system and method disclosed herein has several technical benefits. The disclosed systems and methods increase efficiency in software distribution by maintaining complex and dynamic software distribution batches and facilitating informed software deployments across large organizations, even while memberships within sub-groups and therefore batches are changing during the software deployment process. The disclosed systems and methods also improve computer hardware reclamation and processes for determining whether a computing device has been recovered, or whether additional steps should be taken in the reclamation process. The disclosed systems and methods further automatically and proactively identify insufficient storage space issues, preventing catastrophic organizational errors resulting from data loss. The disclosed systems and methods still further allow for improved resource deployment, such as staffing or hardware based on the determinations made by trained predictive models running at least partially on the data collected by other disclosed modules. The disclosed systems and methods also improve ticket-creation efficiency by automating, pre-populating, and obfuscating certain ticketing fields, in order to reduce the time and mental strain required to complete a ticket, thereby increasing the total throughput of ticket processing.

2. Example Computing Environments

FIG. 1 illustrates an example software distribution system 100 in which various embodiments may be practiced, and is shown in a simplified, schematic format for the purposes of illustrating a clear example. Other embodiments may include more, fewer, or different elements.

Figure 12:
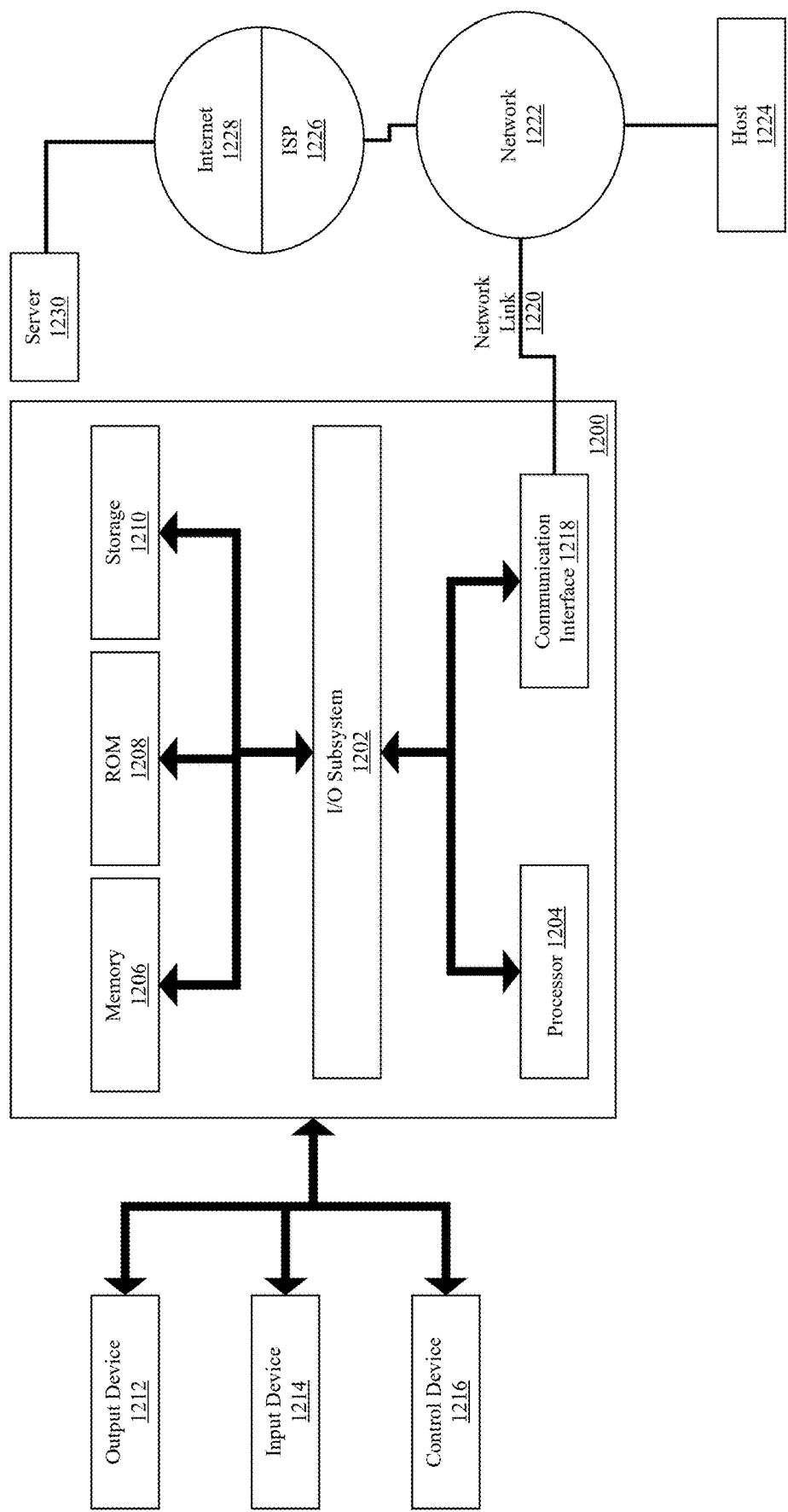
FIG. 12 illustrates a computer system upon which various embodiments may be implemented.

In some embodiments, a software distribution system 100 comprises a distribution automation system 110, a distribution release batching system 120, a distribution scope system 130, a distribution release scheduling system 140, a distribution communication system 150, networked computing devices 160A-Z, which are communicatively coupled through direct physical connections, via a network 199, or as modules within a memory 1206 of a computing system 1200 with shared access to physical resources (see FIG. 12). In certain embodiments, the distribution automation system 110 incorporates one or more of the other devices systems depicted herein in the networked computer system.

In some embodiments, the networked computing devices 160A-Z are managed computing assets with the ability to send messages over the network 199. Examples of communications network 199 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. Each of the networked devices 160A-Z can include additional computing assets, such as database servers or web clients running on the device or belong to other computing assets.

In some embodiments, the distribution automation system 110 is a networked computing device which manages software distributions for an organization over the network 199. The software distributions include one or more software releases, which can include any application, operating system, or kernel installations or updates. Software releases can target both physical or virtual networked computing devices 160A-Z. The contents of a software release, as well as the decision to perform a software release, may be provided by an IT user account, or a third-party account such as a software or operating-system provider.

In some embodiments, the distribution automation system 110 is informed by a distribution release batching system 120. The distribution release batching system 120 receives criteria from an administrative account for grouping networked computing devices 160A-Z into batches 221A-D (see FIG. 2). Those batches 221A-D are provided to the distribution automation system 110 in order to facilitate dividing software distributions into discrete batches for efficient deployment purposes. The distribution release batching system 120 also runs periodically to determine updated batch 221A-D membership of networked computing devices 160A-Z, and provides those results to the distribution automation system 110 as required.

In some embodiments, the distribution automation system 110 is informed by a distribution scope system 130. The distribution scope system 130 receives information regarding the batches 221A-D, along with affected networked computing devices 160A-Z, users, and time zones. The distribution scope system 130 then filters out select networked computing devices 160A-Z based on exceptions, and then combines the received information into a release scope list 350A (see FIG. 3) which indicates which networked computing devices 160A-Z will be updated, which user accounts are responsible for those networked computing devices 160A-Z, and at what time locally the networked computing devices 160A-Z will be updated, respectively.

In some embodiments, the distribution automation system 110 is informed by a distribution release scheduling system 140. The distribution release scheduling system 140 receives multiple software releases and surfaces their intended release dates, in order for scheduled releases to either be combined, overlapped, split up, delayed, or deferred.

In some embodiments, the distribution automation system 110 is informed by a distribution communication system 150. The distribution communication system 150 receives template messages, which are filled-in, scheduled, and sent based upon the release information, the affected users, and the affected networked computing devices 160A-Z. The distribution communication system 110 reviews input information before transmitting messages, as software deployments may have been delayed or cancelled, or the member networked computing devices 160A-Z of a scheduled batch 221A-D may have changed since the most-previously transmitted message.

In some embodiments, the distribution automation system 110, in concert with the other disclosed systems 120, 130, 140, 150, thereby place the networked computing devices 160A-Z associated with a batch 221A in a state where a software deployment is amenable, at the time the batch 221A is scheduled, with reduced or no impact to operation of user accounts associated with the networked computing devices 160A-Z.

Figure 8:
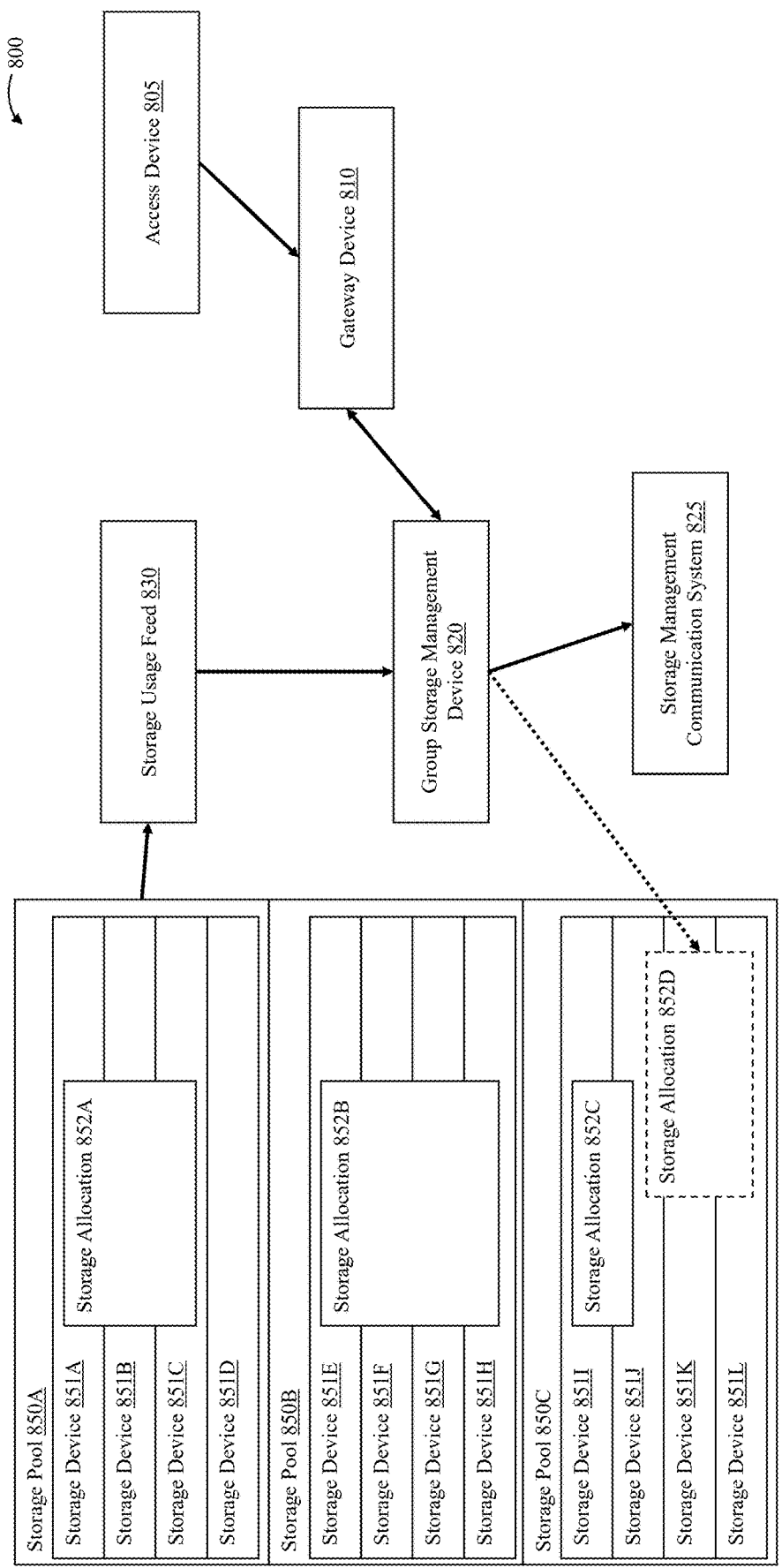
FIG. 8 illustrates a relational diagram depicting an exemplar group storage allocation management system.

FIG. 8 illustrates an example group storage allocation system 800 in which various embodiments may be practiced, and is shown in a simplified, schematic format for the purposes of illustrating a clear example. Other embodiments may include more, fewer, or different elements.

In some embodiments, a group storage allocation system 800 includes a group storage management device 820. The group storage management device 820 identifies storage allocations 852A-D, which indicate how given storage is assigned or allocated for utilization, exceeding their respective thresholds relative to the current capacity of the given storage (e.g., 85%). The group storage management device 820 then determines updated thresholds, determines whether the storage pool 850A upon which a storage allocation 852A resides can accommodate a simple storage increase, or whether a new allocation must be made on another storage pool 850B or 850C, and then requests or facilitates increasing the existing storage allocation 852A or creating a new storage allocation 852D on another storage pool 850C.

In some embodiments, the group storage management device 820 is informed by a storage usage feed 830, which maintains near-real-time storage usage statistics and usage predictions for the storage allocations 852A-D.

In some embodiments, the group storage management device 820 is configured by an access device 805 via a gateway device 810, in order to ensure security in provisioning storage allocations.

In some embodiments, the group storage management system 820 utilizes a storage management communication system 825, which operates similarly to distribution communication system 150, in order to communicate with user accounts associated with storage allocations 852A-D regarding the status of existing storage allocations and the provisioning of additional storage ahead of severe and negative technical outcomes.

Figure 2:
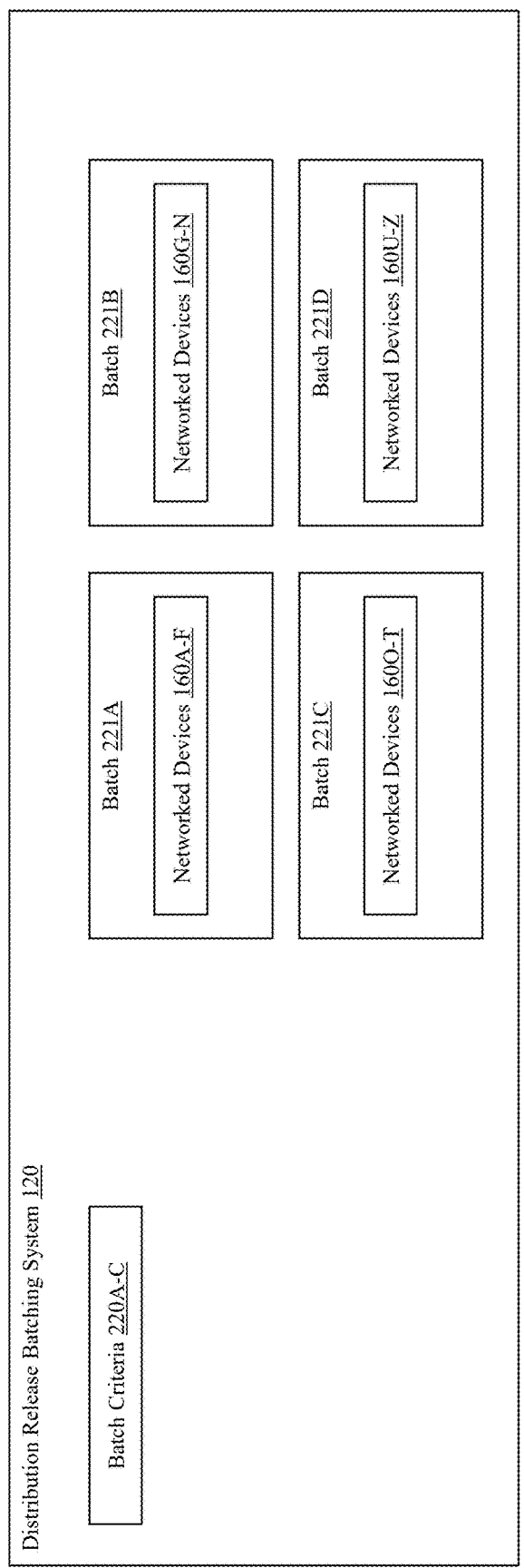
FIG. 2 illustrates a relational diagram depicting an exemplar distribution release batching system of an exemplar software distribution system.

3. Functional Descriptions and Example Processes 3.1. Software Release Management and Deployment FIG. 2 illustrates a relational diagram depicting an exemplar distribution release batching system 120 of an exemplar software distribution system 100, and is shown in a simplified, schematic format for purposes of illustrating a clear example.

As discussed above, networked computing devices 160A-Z can be divided into batches for software deployment purposes. In some embodiments, the distribution release batching system 120 maintains one or more batch criteria 220A-C. Batch criteria 220A-C are utilized to sort networked computing devices 160A-Z into batches 221A-D. Batch criteria 220A-C can include any value or metric directly or indirectly associated with one or more networked devices 160A-Z, including a user account 360A (see FIG. 3) associated with a networked computing devices 160A. All networked computing devices which are new or have recently been reconfigured 160N-Z and which may be impacted by a software release 320A-B can be placed in a "catch-all" batch 221D. Other networked computing devices 160A-M which have previously been assigned to a batch 221A-C will be reassigned to that same batch 221A-C unless otherwise adjusted in the interim between software releases 320A-B. The distribution release batching system 120 uses batch criteria 220A-C to sort network devices 160A-T into respective appropriate batches 221A-C, in order to facilitate a batched software deployment.

In some embodiments, the distribution release batching system 120 allows defining and updating batch criteria 220A-C for any batch categories. The distribution release batching system 120 may present a dashboard with real-time insight into networked computing devices 160A-Z across batches 221A-D. The dashboard may include key metrics (e.g., compliance with a predefined requirement or violations of a predefined requirement).

In some embodiments, the distribution release batching system 120 is configured to intelligently make batch recommendations for the networked computing devices 160A-Z presently assigned to a "catch-all" batch 221D, based on batch criteria 220A-C. The distribution release batching system 120 can be configured to move or recommend a move of networked computing devices 160B from one batch 221A to another batch 221B when those networked computing devices 160B no longer comply with the batch criteria 220A for their presently-assigned batch 221A. In some embodiments, the distribution release batching system 120 is configured to allow timeboxed batch criteria 220C, which would move a networked computing device 160C from one batch 221A to another batch 221B for a period of time, e.g., a single release 320A. The timeboxed batch criteria 220C may include any other criteria permitted among batch criteria 220A-B.

Non-exhaustive examples of batch criteria 220A-C include network environment (e.g., development, testing, production), business division, department, officer status, geographic region, city, virtual machine cluster, membership in particular lists (e.g., an exclusion list, an early adopter list, etc.)

Figure 3:
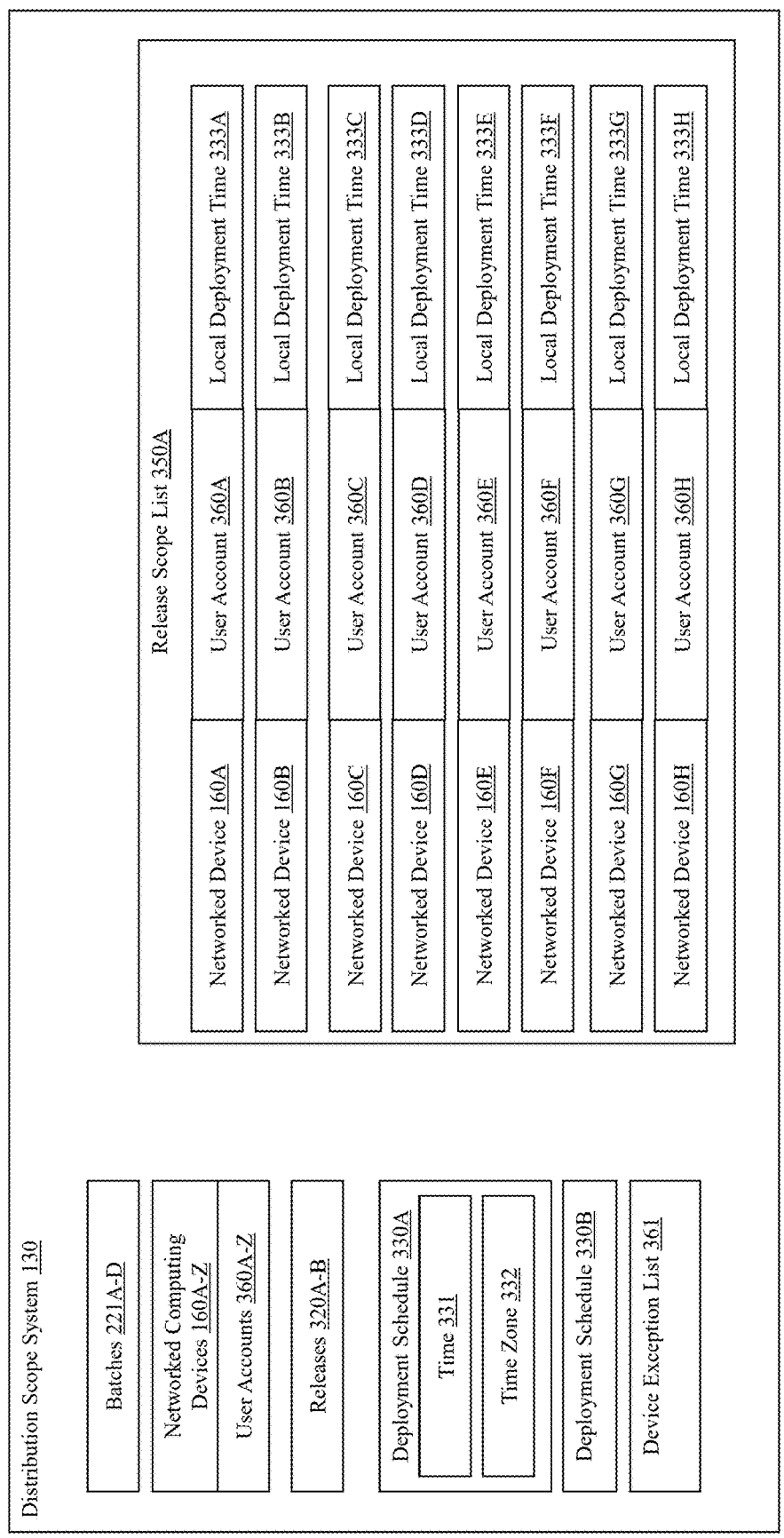
FIG. 3 illustrates a relational diagram depicting an exemplar distribution scope system of an exemplar software distribution system.

FIG. 3 illustrates a relational diagram depicting an exemplar distribution scope system 130 of an exemplar software distribution system 100, and is shown in a simplified, schematic format for purposes of illustrating a clear example.

In some embodiments, the distribution scope system 130 is provided information regarding batches 221A-D and networked computing device 160A-Z identifying information. Additionally, the distribution scope system 130 is provided information regarding user accounts 360A-Z, which are assigned to networked computing devices 160A-Z and are responsible for or affected by software releases made to their respective networked computing devices. For example, if networked computing device 160A is a laptop computer, an associated user account 360A would be owned by the user in physical possession of the laptop and would be impacted when the laptop was unavailable due to a software distribution, and that user can be held responsible to.

In some embodiments, the distribution scope system 130 receives release information 320A-B, which includes the software, operating system, or kernel updates or installation to be made, as well as administrative information such as any release requestor information.

In some embodiments, the distribution scope system 130 receives deployment schedules 330A-B associated with releases 320A-B, which include a time 331 at which the deployment is expected to occur, as well as a time zone 332 to which the time 331 is associated.

In some embodiments, the distribution scope system 130 may maintain a device exception list 361. The device exception list 361 can include networked computing devices 160A-Z for which the release 320A will not be applied. For example, certain secured servers may not receive updates all other secured servers receive. Alternatively, devices associated with sales representatives may receive the same software updates as devices associated with general employees, but over the weekend in order to minimize impact on client satisfaction. Still further, devices associated with visually impaired users may receive their software updates twenty-four hours after devices associated with the general user base, in order to both allow the general user base to identify issues with updated software, and to separate technical support for the general user base from the technical support for the visually impaired, which may require relatively more resources.

In some embodiments, the distribution scope system processes the received information and joins relevant records into a release scope list 350A. The release scope list 350A includes individual records for each networked computing device 160A to be upgraded, and includes at least one user account 360A to be kept appraised of the software deployment process. The release scope list 350A also includes a determined local deployment time 333A-H for each networked computing devices 160A, in order to facilitate timely message sending, or to allow technical support to better identify which resources are needed, and at what times.

In some embodiments, the received information is re-polled periodically, e.g., multiple times per day, and the contents of the release scope lists 350A are concurrently updated based upon the re-polled data.

FIG. 4 illustrates a relational diagram depicting an exemplar distribution release scheduling system 140 of an exemplar software distribution system 100, and is shown in a simplified, schematic format for purposes of illustrating a clear example.

In some embodiments, the distribution release scheduling system 140 receives information regarding releases 320A-B and batches 221A-F, in order to produce respective deployment dates 430A-F. Administrator accounts can retrieve, via the distribution release scheduling system 140, the deployment dates 430A-F of releases and their respective batches 221A-F, and transmit decisions on whether one or more batches 221A-F should be moved to either have a deployment date 430A which avoids another deployment date 430B, or to have a deployment date 430C which overlaps with another deployment dated 430E. Multiple deployments to the same batch 221A of networked computing devices 160A-F in sequence within a short period of time may substantially impact the user accounts of those networked computing devices 160A-F, while applying multiple releases 320A-B to the same networked computing devices 160A-F at the same time would involve coordinating device usage and resets, and may also make determining which of the releases 320A-B causes an unexpected effect in the networked computing devices 160A-F more difficult.

FIG. 5 illustrates a relational diagram depicting an exemplar distribution communication system 150 of an exemplar software distribution system 100, and is shown in a simplified, schematic format for purposes of illustrating a clear example.

In some embodiments, the distribution communication system 150 receives one or more messages to send at a time to members of a release contact list 450A. The release contact list includes contact information for the networked computing device 160A itself and contact information for the associated user account 360A. In an example, when the distribution communication system 150 sends a message for an email or end user communication display to facilitate a software update, that email or end user communication message can be directed toward the networked computing device 160A itself, and whichever user ultimately uses the networked computing device 160A next. In another example, when the distribution communication system 150 sends an email to facilitate a software update, that email can be directed toward the user account assigned to take steps to facilitate the software update.

In some embodiments the distribution communication system 150 may only send emails or popup display communications to a networked computing device 160A when a particular assigned user account 360A is logged in. Otherwise, emails or popup displays are not sent, and are either held until the user account 360A logs in, or the software update is performed regardless, with no pop-up display. Networked computing devices 160A without assigned user accounts 360B-H, such as servers or terminal computing devices, will receive the email or popup displays at whichever user account 360B-H is logged in, if a user account 360B-H is logged in at all. The distribution communication system 150 will separate all networked computing devices 160A-Z to be messaged into two groups: those with an assigned user account 360A, and those without.

In some embodiments, the message may be a templated message, and information regarding the networked computing device 160A, the user account 360A, the local deployment time 333A, or the deployment date 430A, may be inserted into the template as required before sending the message.

In some embodiments, a deployment or batch 221A may have multiple separate messages scheduled to be sent. In such embodiments, the distribution communication system 150 verifies membership in the release contact list, based on updated information from the distribution release batching system 120, the distribution scope system 130, or the distribution release scheduling system 140, in order to properly contact the correct networked computing devices 160A-H and user accounts 360A-H. This includes verifying the relevant release 320A is still scheduled to occur.

Figure 6:
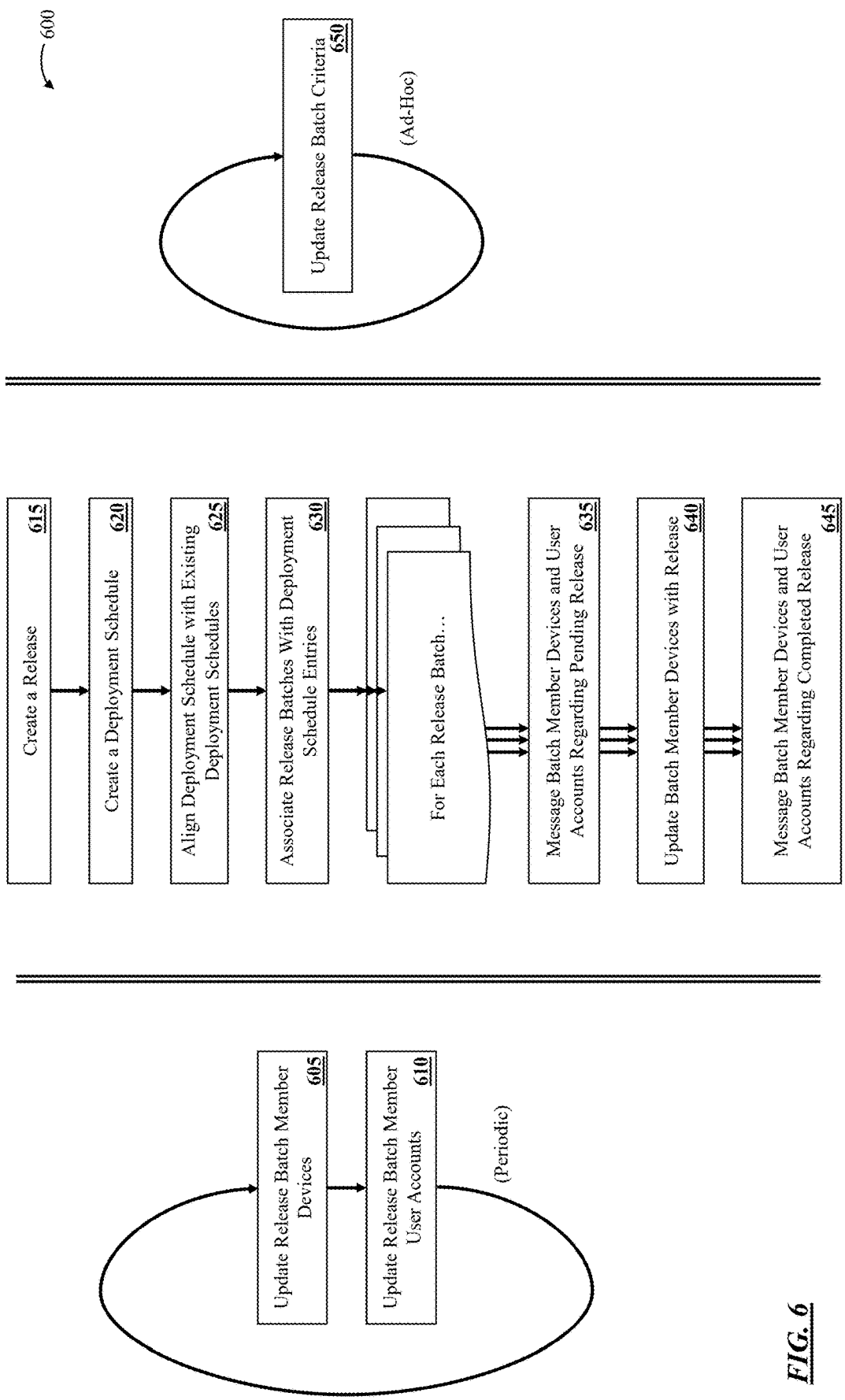
FIG. 6 illustrates a flowchart depicting an exemplar protocol for releasing software in a batched software deployment, while concurrently updating batch membership and batch criteria.

FIG. 6 illustrates a flowchart depicting an exemplar protocol 600 for releasing software in a batched software deployment, while concurrently updating batch membership and batch criteria. FIG. 6 is shown in simplified, schematic format for purposes of illustrating a clear example and other embodiments may include more, fewer, or different elements connected in various manners. FIG. 6 is intended to disclose an algorithm, plan, or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In some embodiments, the protocol 600 includes updating the networked computing devices 160A-F which are members of a particular batch 221A in block 605. Membership may change due to certain parameters or qualities which describe certain networked computing devices 160A changing (e.g., from being a remote device to being an on-site device), or because new networked computing device 160B is brought online or are provisioned. Membership may also change due to changes in batch criteria 220A-C made by administrative accounts.

In some embodiments, the protocol 600 then includes updating the user accounts 360A-F which are members of a particular batch 221A in block 610. Membership may be solely based on the association between a particular networked computing device 160A and a particular user account 360A. Membership may also change due to certain parameters or qualities which describe certain user accounts 360B changing (e.g., from being a US account to being a European account), or because new user accounts 360B are associated with existing, previously batched computing devices 160A. Membership may also change due to changes in batch criteria 220A-C made by administrative accounts and directed toward user accounts 360A-H. In some embodiments, when a networked computing device 160A and/or user account 360A are eligible to be in multiple batches, the eligible batch with the minimum capacity is associated to the networked computing device 160A and/or user account 360A.

In some embodiments, blocks 605 and 610 may then, either immediately or after a period of time, repeat, and may continue to do so indefinitely.

In some embodiments, in block 615, the protocol 600 includes creating a release 320A. A release 320A may follow a decision made by one or more stakeholders to install or update software despite any reasonably predictable negative outcomes to the affected networked computing devices 160A-H or user accounts 360A-H.

In some embodiments, in block 620, the protocol 600 includes creating a deployment schedule 330A for the release 320A. The deployment schedule 330A may include a start time, an end time, a guaranteed completion time, a promised rollback time, and one or more sub-steps which may have nested concurrencies and individual start times, end times, guaranteed completion times, or promised rollback times, which may be combined as contingencies to calculate an overall start time, end time, guaranteed completion time, or promised rollback time for the entire release 320A.

In some embodiments, in block 625, the protocol 600 includes adjusting as appropriate the deployment schedule 330A in the distribution release scheduling system 140 in order to avoid conflicts or create desired alignment with other deployment schedules 330B.

In some embodiments, in block 630, the protocol 600 includes associating batches 221A-B for the release with particular deployment schedule 330A-B entries. Batches 221A-B for the same release 320A are preferably not performed at the same time, but may be when the batch differentiation is immaterial, or when differently-skilled teams are performing the deployment for a particular batch. For example, when batch 221A is for English-assigned networked computing devices 160A-D and batch 221B is for Spanish-assigned networked computing devices 160E-H, then the software release 320A scheduled for release within batch 221A could be executed and reviewed by an English-speaking support team while the software release 320A scheduled for release within batch 221B is executed and reviewed simultaneously by a Spanish-speaking support team.

In some embodiments, once each batch 221A-B is associated to the release 320A, for each batch 221A-B in block 635 the protocol 600 includes messaging batch member networked computing devices 160A-F (e.g., via email or end user communication messaging) and user accounts 360A-F

(e.g., via an email) regarding the pending release 320A. The message may include information regarding the deployment schedule 330A as it affects the recipients 160A-F, 360A-F, contact information for those accounts 360A-F which intend to send follow-up messages, or instruction to any reader to facilitate the release 320A at the networked computing device 160A-F. Multiple messages may be sent at multiple times with varying content, in order to emphasize and reiterate relevant information. In some embodiments, blocks 605 and 610 will execute prior to sending messages in block 635, in order to ensure appropriate recipient user accounts 360A-F and networked computing devices 160A-F.

In some embodiments, the protocol 600 includes updating the networked computing devices 160A-F in batch 221A with the software contents of the release 320A. The update may be facilitated by additional action or inaction by the user account 360A. Updating may include failed updates that are ultimately rolled back.

In some embodiments, the protocol 600 includes messaging batch member networked computing devices 160A-F and user accounts 360A-F regarding the completed release 320A. The message may include information regarding the success or failure of the release 320A, whether any final actions (e.g., restarting the networked computing device 160A-F or reconnecting to network 199) are required, or what new features or improvements are enabled or have been made to the networked computing devices 160A-F via the release 320A.

Throughout the execution of the protocol 600, block 650 can be executed at any time by an administrator. In block 650, the protocol 600 updates the release batch criteria 220A-C. As release batch criteria 220A-C affect many steps in the protocol 600, it is preferred that blocks 605 and 610 execute again in order to update batch memberships, and consequently the release contact list 450A used in blocks 635 and 645.

3.2. Hardware Asset Reclamation

Figure 7:
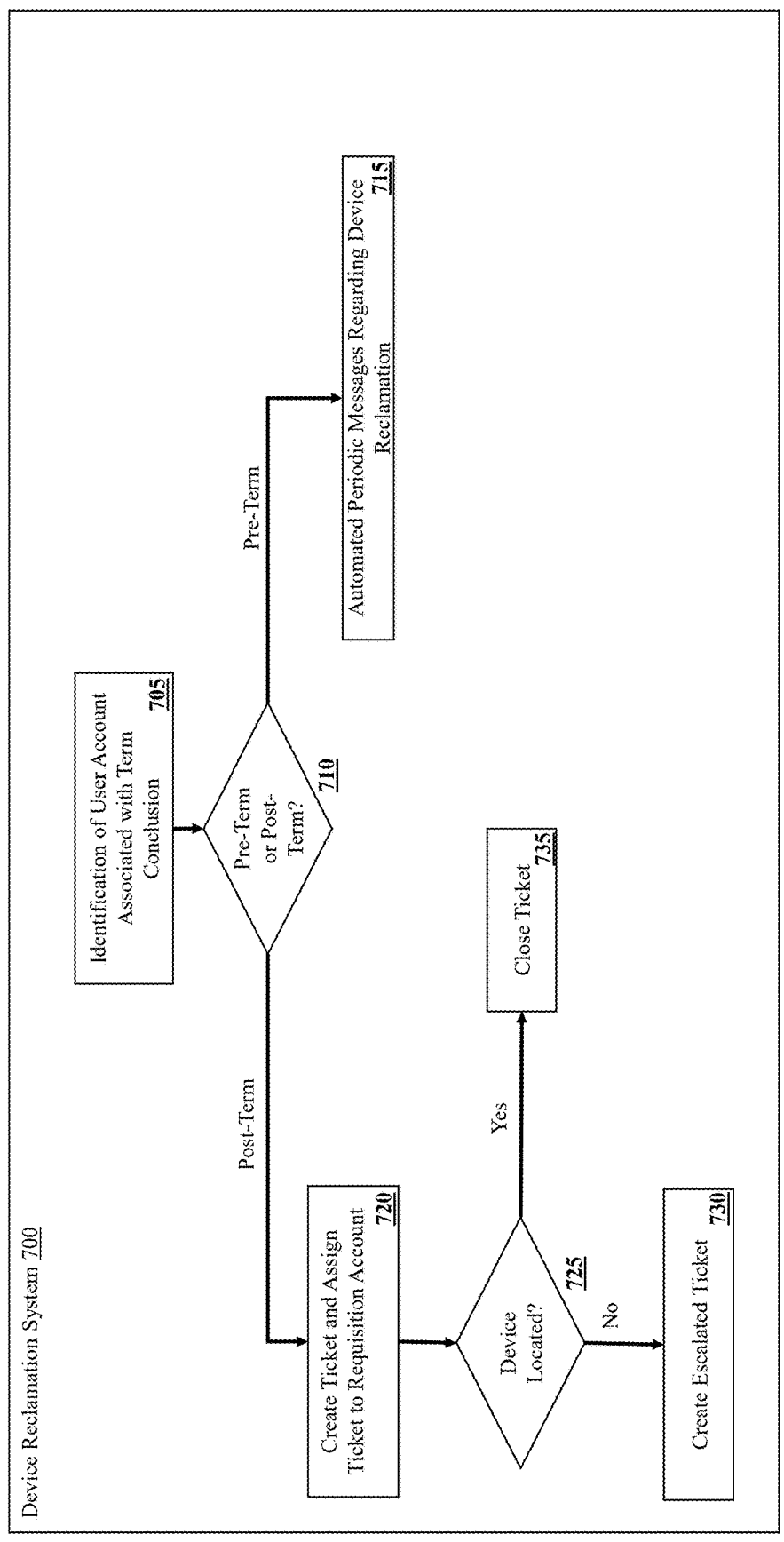
FIG. 7 illustrates a flowchart depicting an exemplar system for reclaiming computing devices of end users concluding their term with an organization.

FIG. 7 illustrates a flowchart depicting an exemplar device reclamation system 700 of end users concluding their term with an organization. FIG. 7 is shown in simplified, schematic format for purposes of illustrating a clear example and other embodiments may include more, fewer, or different elements connected in various manners. FIG. 7 is intended to disclose an algorithm, plan, or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In some embodiments, the device reclamation system 700 identifies a user account 360A associated with a term conclusion in block 705. A term conclusion can include a firing, quitting, or laying off of an employee, an end of a contract period, an expiration of a guest access pass, or any other period of time at the conclusion of which a networked computing device 160A may need to be surrendered or returned by a holder. The term conclusion can be reported by a user account input, or by software such as human resources or payroll software which explicitly tracks term conclusions. The term conclusion can also be reported by software or processes that incidentally track term conclusions, such as the expiration and non-renewal of a corporate credit card, a deactivated email address, or a prevented login attempt by that user. In such cases, secondary processes may corroborate or confirm the term conclusion, for example by contacting the assigned manager user account 360B of the user account 360A which the device reclamation system 700 believes is associated with a term conclusion.

In some embodiments, in block 710 the device reclamation system ascertains whether the term conclusion is at a pre-term stage, or a post-term stage. A pre-term stage is indicative that the term has not yet concluded, or that the networked computing device 160A need not yet be surrendered: in some examples these points in time are not identical; for example, while an employee must return their laptop three days before their last day, pre-term could extend either until their last day, or until the laptop is due. Alternatively, while an employee must return by post their laptop within thirty days of their term conclusion, pre-term could extend either until their last day, or until thirty days and a reasonable delivery window after their last day has elapsed. A post-term stage is indicative that the term has concluded, and in general is complementary to the pre-term stage.

In some embodiments, when the term conclusion is in a pre-term stage, in block 715 the device reclamation system 700 sends periodic automated messages regarding reclamation of the networked computing device 160A. These messages may be sent to the user account 360A, the manager user account 360B, or some other responsible user account 360C, such as a concerned service manager of that division or country or a device steward in a given facility of an organization. The messages may either request the return of the networked computing device 160A, the repatriation of the networked computing device 160A to the premises of the organization, an explanation regarding the whereabouts of the networked computing device 160A, or the logging and docketing of the return process of the networked computing device 160A.

In some embodiments, when the term conclusion is in a post-term stage, in block 720 the device reclamation system 700 creates a ticket and assigns the ticket to a requisition account. The requisition account may be the manager user account, the concerned service manager of that division or country, or some other responsible user account 360C. The ticket formally requests the return and logging thereof of the networked computing device 160A.

In some embodiments, in block 725 the device reclamation system 700 determines whether the networked computing device 160A was located. The determination may be made based on an assertion by a trusted user account 360B-C, or a user account that is financially responsible for re-provisioning or replacing the networked computing device 160A when it is next needed in service. The determination may be made based on a scan of a barcode or RFID known to be associated with the networked computing device 160A by a scanner device connected to the network 199. The determination may be made based on the networked computing device 160A connecting wired or wirelessly to the network 199 when doing so would be improbable if not in the possession of the organization. For example, when hundreds of laptops are recovered and put into a device lockup area with access to electrical charging and a wired or wireless connection, those laptops which connect to network 199 from within that device lockup area (determined by, for example GPS position, radio triangulation via network 199 access points, or other known localization techniques) may be determined to be located, despite no human being consciously being aware or verifying that a particular laptop of those laptops is formally located.

In some embodiments, when the device is located, in block 735 the device reclamation system 700 closes the ticket. However, when the device is not located within a particular period of time, or because the device cannot be reclaimed from the concluding user, in block 730 the device reclamation system 700 creates an escalated ticket. An escalated ticket may be sent to various user accounts, and carries a presumption that the networked computing device 160A will likely not be readily returned. Owners of the user accounts may consider physically travelling to the most likely location of the networked computing device 160A and demanding the return of the device, may consider expensing the networked computing device 160A as a loss, may consider reducing a user's final paycheck by the replacement value of the networked computing device 160A, or may consider taking legal action up to and including pressing for criminal charges of theft against the term-concluded user, depending upon the value of the networked computing device 160A, the value of any data or access on the networked computing device 160A, the relationship to the term-concluded user, and any legal obligations the organization may be beholden to with respect to the networked computing device 160A. In some embodiments, the originally-created ticket is closed upon the creation of the escalated ticket.

3.3. Dynamic Storage Allocation and Issue Management

Returning to FIG. 8, in some embodiments the group storage allocation system 800 includes one or more storage devices 851A-K. A storage device 851A is generally a physical drive for the read-write access of data, but it is contemplated that a storage device may be a server including a processor and an operating system, or tape-based, read-only storage devices. Storage devices 851A-D, 851E-H, 851I-L may be organized into storage pools 850A-C. Storage pools 850A are collections of physical storage devices 851A-D, which can be represented virtually as a single storage device or represented as separate storage addresses that are fungible among one another. Storage pools 850A may be organized in a Redundant Array of Inexpensive Disks (RAID) in order to improve access time and reliability of the overall pool 850A, at the possible expense of storage capacity.

Therefore, a storage pool 850A may have one or more storage allocations 852A to different user accounts or groups of user accounts, which may physically span multiple storage devices 851A-C while appearing to a user account 830A accessing the storage allocation 852A to be a solitary storage device. Storage Allocations 852A may have room to grow, storage allocations 852B may essentially or actually fill their storage pool 850B, or storage allocations 852C and storage allocations 852D may be permitted to be on the same storage pool 850C.

Any and all storage pools 850A-C may be of different sizes, and accommodate any number of storage allocations, depending upon their constituent storage devices 851A-L. Similarly, any and all storage devices 851A-L may be of different sizes, as well as type of manufacture (e.g., hard disk vs. solid state).

Figure 9:
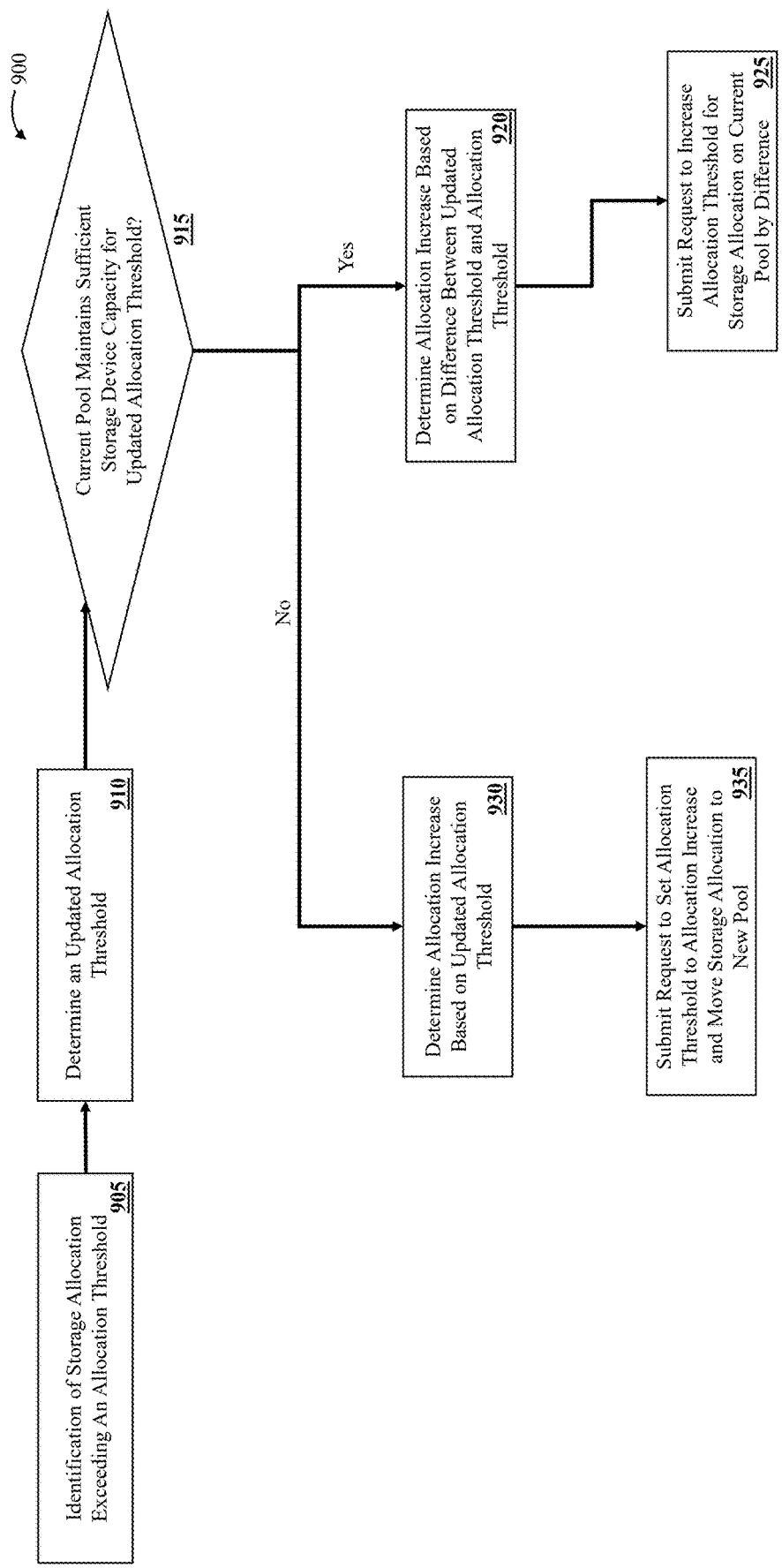
FIG. 9 illustrates a flowchart depicting an exemplar protocol for ascertaining storage allocation thresholds being approached, determining how much storage would be expected, whether that storage is readily available, and requesting said storage.

FIG. 9 illustrates a flowchart depicting an exemplar protocol 900 for ascertaining storage allocation thresholds being approached, determining how much storage would be expected, whether that storage is readily available, and requesting said storage. FIG. 9 is shown in simplified, schematic format for purposes of illustrating a clear example and other embodiments may include more, fewer, or different elements connected in various manners. FIG. 9 is intended to disclose an algorithm, plan, or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In some embodiments, the protocol 900 includes identifying a storage allocation 852A exceeding an allocation threshold in block 905. The identification may be performed by the group storage management device 820, which maintains an allocation threshold for each storage allocation 852A-C, upon receipt of updated storage allocation 852A usage as reported by the storage usage feed 830. Alternatively, the storage usage feed 830 may maintain a copy of the allocation threshold for storage allocation 852A, and may only message the group storage management device 820 upon determining the usage currently exceeds the allocation threshold for storage allocation 852A.

In some embodiments, the protocol 900 includes in block 910 determining an updated allocation threshold in block 910. The updated allocation threshold may be based on a static value, such as increasing the threshold by 25%. The updated allocation threshold may also be based on an equation that examines prior usage and usage rate changes over a period of time to determine an updated allocation threshold. The updated allocation threshold may also be determined by AI logic and process automation logic. The updated allocation threshold may also be determined by a machine learning model or an artificial intelligence model, trained upon training usage rates pre-update, training usage rate changes pre-update, training updated allocation thresholds, training usage rates post-update, training usage rate changes post-update, cost, including operating costs or the time value of money used in determining whether to increase an allocation, or a combination thereof.

In some embodiments, the protocol 900 includes in block 915 determining whether the current pool 850A maintains sufficient storage device 851A-D capacity to accommodate the updated allocation threshold. For example, presuming that storage allocation 852A is utilizing approximately 70% of storage pool 850A, a 25% increase of storage allocation 852A could be accommodated within storage pool 850A. However, a 100% increase of storage allocation 852A could not be accommodated within storage pool 850A, as over half of storage pool 850A is already allocated to storage allocation 852A.

In some embodiments, when the current pool 850A maintains sufficient storage device 851A-D capacity to satisfy the updated allocation threshold, the protocol 900 in block 920 includes determining an allocation increase based on the difference between the updated allocation threshold and the allocation threshold. As the allocation increase will be on the same storage pool 850A which currently houses the storage allocation 852A, only the additional portion of storage pool 850A will need to be requisitioned and provisioned. Thus, in block 925, the protocol includes submitting a request to increase the storage allocation threshold on the current pool 850A by the calculated difference. Once the request is processed and approved, storage allocation 852A will be expanded further within current pool 850A, and the storage allocation threshold for storage allocation 852A will be updated at the group storage management device 820, the storage usage feed 830, or both.

In some embodiments, when the current pool 850A does not maintain sufficient storage device 851A-D capacity to satisfy the updated allocation threshold, the protocol 900 in block 930 includes determining an allocation increase based on the updated allocation threshold. As the allocation increase will move to a new storage pool, the entire updated storage allocation will be requisitioned and provisioned. Thus, in block 935, the protocol includes submitting a request to set the storage allocation threshold on the storage allocation 852A to the allocation increase, and to move the storage allocation 852A to a larger pool. Once the request is processed and approved, storage allocation 852A will be moved to a new pool with more space than pool 850A, storage allocation 852A will be allowed to expand within that new pool, and the storage allocation threshold for storage allocation 852A will be updated at the group storage management device 820, the storage usage feed 830, or both. Alternately, when an allocation is allowed to span multiple storage pools, only a part of the storage allocation 852A will be moved to the new pool.

In some embodiments, the group storage management device 820 is programmed to submit a request to a ticketing system without human intervention, even if the ticketing system accepts input only via a Web-based graphical user interface (GUI). The request can be to create a ticket, check the ticket status, add an update to the ticket, closet the ticket, or to otherwise manage tickets. The device 820 is programmed to utilize a control tool for controlling web browsers or functionalities through automated GUI interactions, such as the Selenium package. More specifically, the device 820 is programmed to establish an application programming interface (API) for the ticketing system based on a mapping between desired functions and sets of interactions with the GUI. For example, a function of create-ticket ( ) can be mapped to selecting a first menu option, entering information into a form, and clicking a create button, while a function of check-ticket-status ( ) can be mapped to selecting two menu options, providing information into a text field, and clicking on a retrieve button to filter out information related to all tickets except for the target ticket. The device 820 can thus be programmed to launch the control tool, receive a function call into the API, in response request the control tool to send the corresponding set of interactions to the Web-based GUI of the ticketing system, and receive the result of the interactions via the control tool. By virtue of these features, issues can continue to be managed by the ticketing system.

Figure 10:
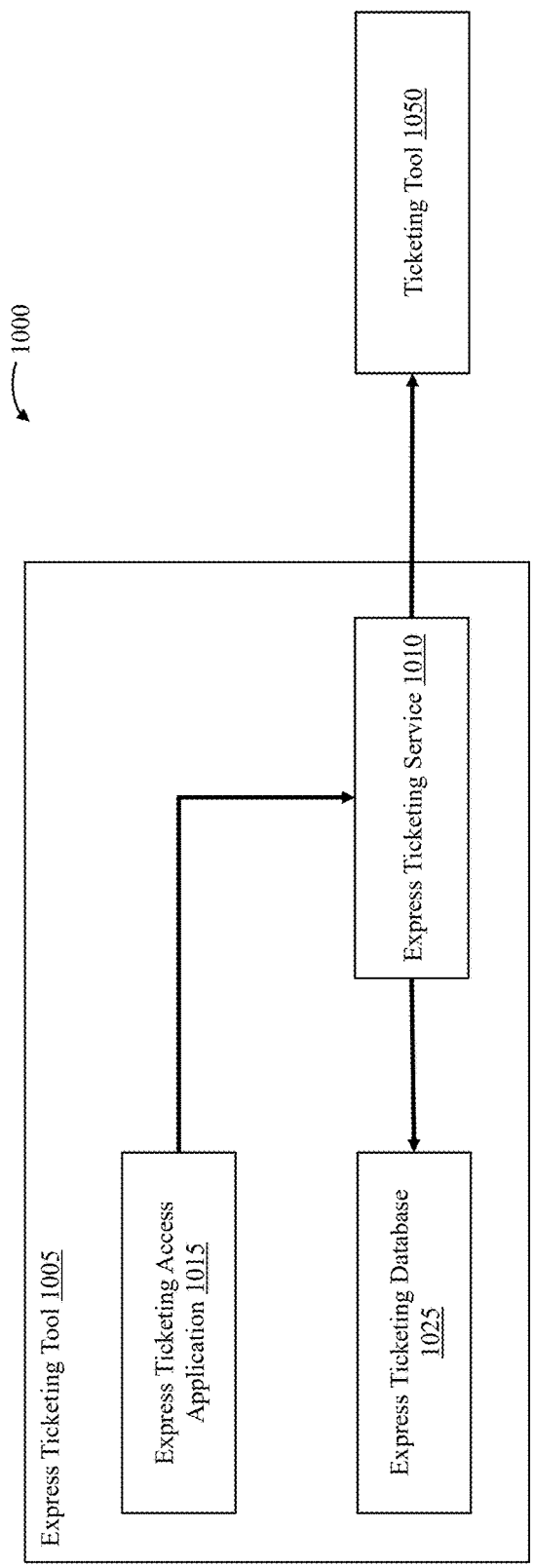
FIG. 10 illustrates an example group express ticketing system in which various embodiments may be practiced.

FIG. 10 illustrates an example group express ticketing system 1000 in which various embodiments may be practiced, and is shown in a simplified, schematic format for the purposes of illustrating a clear example. Other embodiments may include more, fewer, or different elements.

In some embodiments, the express ticketing tool 1005 is designed to improve the functionality of a ticketing tool 1050. A ticketing tool 1050 manages digital workflows for organizations. Ticketing tool 1050 receives ticket inputs, the ticket inputs including a plurality of fields. Ticketing tool 1050 maintains these ticket, tracks updates, transmits notifications, and closes tickets based on criteria or inputs.

In some embodiments, the express ticketing tool 1005 maintains an express ticketing database 1025. Using the express ticketing database 1025, the express ticketing tool 1005, via an express ticketing service 1010, creates tickets for submitting to the ticketing tool 1050. The express ticketing service 1010 is a software module that receives input from an express ticketing access application 1015, including some or all of the information required to create a ticket in the ticketing tool 1050. The express ticketing service 1010, combining data from the express ticketing access application and the express ticketing database 1025, prepares tickets using prepopulated data or logic for submission to the ticketing tool 1050.

In some embodiments, the express ticketing access application 1015 is a computer desktop application or a mobile application. The express ticketing access application 1015 may maintain certain information about a user account 360A which is accessing the express ticketing access application 1015. Consequently, when that user account 360A begins to prepare an express ticket, for ultimate submission at the ticketing tool 1050, the express ticketing access application 1015 may pre-populate certain ticket fields in the express ticket. Depending upon the field, the express ticketing access application 1015 may hide the field from the user account 360A.

In some embodiments, for example, the express ticketing access application 1015 may include an interface element entitled "Reboot Desktop". When the user account 360A selects "Reboot Desktop", an express ticket is automatically prepopulated with an issue type of "On-site Hardware Reset", a severity of "Low", a technician ID of user account 360A, and may only request user account 360A to enter an employee name. Once completed, the express ticket can be submitted to the express ticketing service 1010.

At the express ticketing service 1010, the express ticketing service 1010 may requisition the express ticket database 1025 for the desktop computer ID of the computer associated with the name provided in the express ticket. The express ticketing service 1010 may also requisition the user account 360B associated with the name provided in the express ticket. Once the express ticketing service 1010 receives this information, the express ticketing service 1010 can prepare a ticket for submission to the ticketing tool 1050. The ticket may include the technician ID of user account 360A, the customer ID of user account 360B, the issue type of "On-site Hardware Reset", the severity of "Low", and may include a boilerplate descriptive paragraph, for example the following with the bracketed language appropriately filled in:

"[Customer First Name] asked that I examine their desktop computer. Upon examination, I determined that their issue would be resolved by rebooting their device. I rebooted their device, and no further issues have been experienced."

This ticket is then logged back into the express ticketing database 1025, and filed at the ticketing tool 1050. In some cases, the issue is resolved at the time of filing the ticket, and consequently the ticket should be set to closed. In such examples, when the ticketing tool 1050 cannot file an initial ticket in a "closed" state, the express ticketing service 1010 will file the ticket at the ticketing tool 1050 directly in the "closed", or alternatively soon after will close the ticket at the ticketing tool 1050.

In some embodiments, the express ticketing tool 1005 allows for submitting multiple tickets at once in batches. For example, if a technician has to physically distribute new keyboards to a group of desktop computers, each of those desktop computers may be owned by different divisions of an organization, which all require separate tickets for auditing purposes. Using the express ticketing tool 1005, the technician may be able to type in the computer identifiers at the express ticketing access application in a list format and submit that list, and the express ticketing service 1010 will separate those identifiers into separate tickets, populate those tickets with otherwise identical pertinent information, and file the multiple tickets at the ticketing tool 1050.

In some embodiments, the ticketing tool 1050 may not properly log all ticket creation attempts. To alleviate this, the express ticketing service 1010 can automatically retry to submit tickets when ticket creation failure is detected. Ticket creation failure can be detected based upon the response or lack of a response sent from the ticketing tool 1050 to the express ticketing service 1010, or by requesting the ticket information from the ticketing tool 1050.

3.4. Predictive Modeling of Incident Occurrence and Handling

Figure 11:
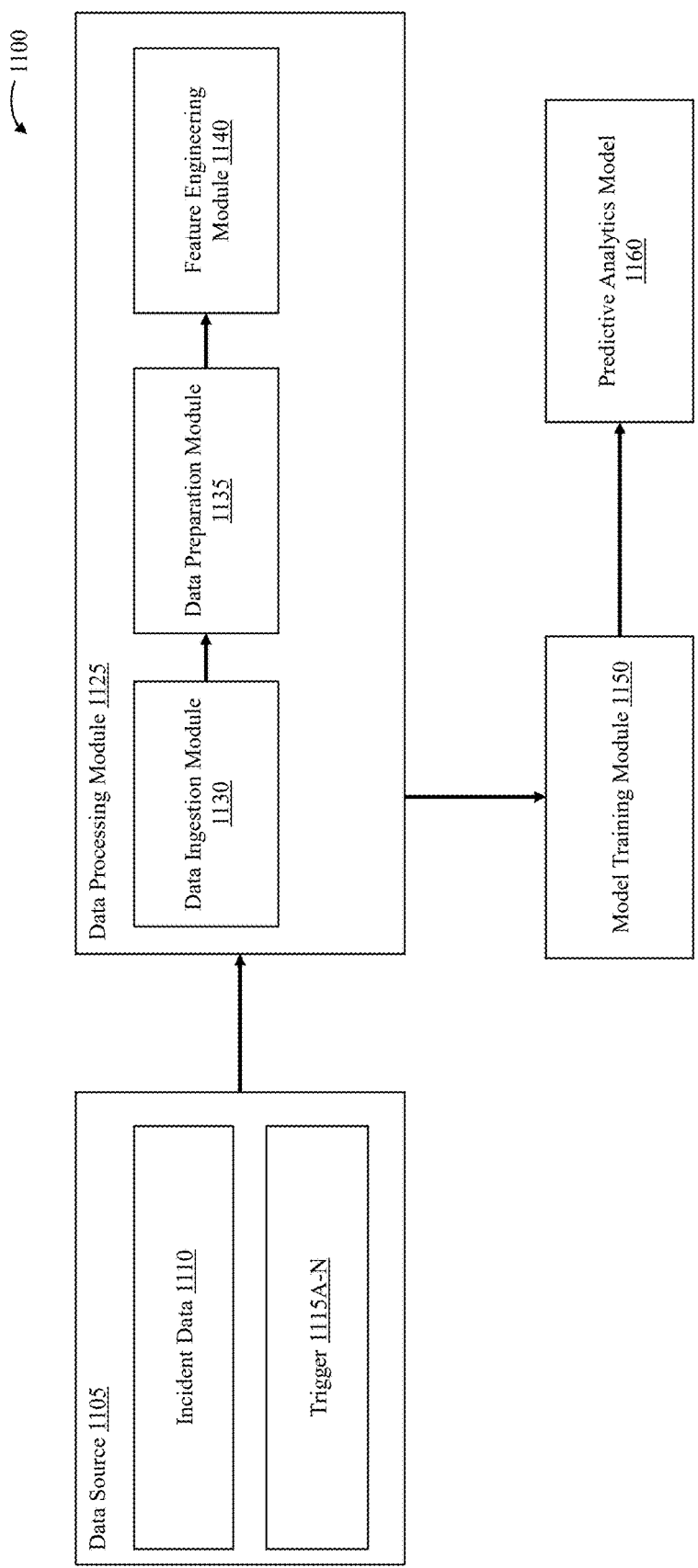
FIG. 11 illustrates an example predictive analysis system in which various embodiments may be practiced.

FIG. 11 illustrates an example predictive analysis system 1100 in which various embodiments may be practiced, and is shown in a simplified, schematic format for the purposes of illustrating a clear example. Other embodiments may include more, fewer, or different elements.

In some embodiments, the predictive analysis system 1100 is programmed to build a predictive analytics model 1160 for incidents by leveraging historical data from a data source 1105 to forecast future incident volumes. The predictive analysis system 1100 is programmed to initially obtain relevant data for the predictive analytics from the data source 1105. The relevant data can include incident data, such as incident ID, description, category, priority, or timestamp. The relevant data can also include trigger data that are likely have specific impact on incident volumes, such as new hire data, holiday data, security device activation and expiration data, or software release data. The predictive analysis system 1100 is programmed to process the obtained data with appropriate normalization and cleanup. The normalization can include standardizing numerical features or encoding categorical variables using known methods. The cleanup can include handling missing values, removing duplicates, or converting data types using known methods.

In some embodiments, the predictive analysis system 1100 is programmed to generate features for a training dataset. The incident data would include time series indicating when incidents occurred and relevant information regarding the incidents. The time series data can be resampled to produce updated time series data with a uniform time scale (e.g., daily, weekly). The training data can include time-based values, such as time of day, day of week, month, and year, to capture any temporal patterns in the incident data. The training data can include textual features, such as the incident description, sentiment, keywords, or topics modeling, to capture the content-based information. The training data can include categorical features, such as incident category or priority. The training data can also include derived features based on the existing data, such as incident duration, response time, or the number of previous incidents of the same time in a given time period as lag features.

In some embodiments, the predictive analysis system 1100 is programmed to build machine learning models, such as the predictive analytics model 1160, to predict various outcomes related to incident volumes associated with incident types from the generated features, such as the expected incident volume during the next hour, day, week, month, or year, given the circumstances. The training data would be structured to pair the features with appropriate labels. For example, to predict the expected incident volume for the next month, the training dataset can comprise historical data for two-year periods as features and the total number of incidents or a pattern of weekly numbers of incidents in the months following the two-year periods as the label for supervised learning. To predict the expected incident volume for different incident types, the labels can further include details of the incidents occurring in the months following the two-year periods. The machine learning model built from this training dataset could thus be used to make the desired prediction based on and specific to the current two-year history. The training can be performed using known methods, such as Seasonal AutoRegressive Integrated Moving Average (SARIMA) or the Prophet forecasting procedure.

The training data intervals are not limited to two-year periods, and may be any interval of time. The prediction window is not limited to the next month, and may be any interval of time any length of time in the future or past. The aggregation period does not need to be weekly, but may be any interval of time. Further, the training data intervals or aggregation periods may vary, or overlap: for example, periods closer to the present day of training may be shorter than periods further in the future or past. Training data intervals may also vary according to labels, where In some embodiments, the predictive analytics system 1100 receives this information, as well as relevant historical information, and relevant information related to the release itself (e.g., the release scope list 350A). The data source 1105 sends this incident data 1110 in response to a trigger 1115A-N, which is any event that can contribute to the predictive analytics. In this example, it is the creation of the release 320A, and a consequent message received from the distribution communication system 150.

In some embodiments, the data processing module 1125, the incoming incident data 1110 is ingested by a data ingestion module 1130. The incident data 1110 may arrive in multiple packets from multiple data sources 1105, and the data ingestion module 1130 receives the incident data 1110 and awaits receipt of all of the incident data 1110 before forwarding the incident data 1110 received to the data preparation module 1135.

In some embodiments, the data preparation module 1135 standardizes the incident data 1110, for example handling missing values, outliers, and duplicates, and transforming, normalizing, and standardizing numerical features, and encoding any categorical variables not explicitly received. The data preparation module 1135 also organizes or creates time-based features, and may resample data to conform to a uniform time scale. The standardized data is then forwarded to the feature engineering module 1140.

In some embodiments the feature engineering module 1140 then prepares relevant features. Features can include time-based features, which could be the time of day, the day of week, month, and year, or the date itself, to capture any temporal patterns in the data. Features can also include textual features, extracted from a written description, and be categorized using another trained model to determine keywords, the sentiment of the written description, or the topic of the written description. Features can also include categorical features, such as incident category or priority, into a machine-workable format. Features can also include derived features, which are based on other existing data, and can include incident duration, response time, or the number of previous incidents in a given time period.

The resulting features and standardized data can then be provided to the model training module 1150 to train a predictive analytics model 1160. Training can include creating a new predictive analytics model 1160, or updating an existing predictive analytics model 1160.

In some embodiments, as an example a release 320A is scheduled, and every desktop computer 160A-N at the international organization is expected to be impacted. The software application to be deployed is an update to an internal messaging tool. Previously, updates to the internal messaging tool first fail on approximately 10% of desktop computers 160A-N, and those failures in the past have been primarily due to personal configurations user accounts 360A-H have made to those desktop computers 160A-N.

The above data can be applied to the predictive analytics model 1160, which has been trained, at least in part, on similar incident data 1110. The predictive analytics model 1160 may determine that alternative access to computing resources or additional staffing will be required in time zones that have active working hours during the release 320A. This determination may be made upon the fact that the messaging application is used during the work day, and outages are noticed immediately and induce impact: thus, the statistically 10% of users which will experience a failed update will immediately submit tickets and request service to either correct the problem, or roll-back the update. The determination may also include, based on past performance, determining that the per-user incident time is relatively low, because the user will simply need their configuration file reset. However, the determination may also include, determining that the total incident time will be relatively long, as the only way to determine if a messaging application failure has occurred is if the affected user reports the issue. Therefore, additional requirements for additional computing or human resources may be high initially, but also 24-hour availability may be required to service all time zones for several days as affected users determine they are affected. The predictive analytics model 1160 may be able to explain the reasoning used to arrive at the determination, or the predictive analytics model 1160 may simply report the determination.

The predictive analytics model 1160 may also determine a series of mitigation steps to prevent future incidents: for example, testing software releases 320A-B from certain teams or involving certain applications on test subject computing devices 160A-C before deploying to all of the computing devices 160A-Z, or taking solid state backups rather than tape backups of certain computing devices 160D-F for software releases 320A-B which may have a relatively high rate of failure that can be largely ameliorated with a quick rollback. Alternatively, when the predictive analytics model 1160 may not determine one or more mitigation steps, the predictive analytics model may instead determine that alternative access to computing resources or additional staffing will be required, in order to handle an increased amount of service requests from users related to the projected incidents.

4. Example Implementation

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 12 is a block diagram that illustrates an example computer system with which an embodiment may be implemented. In the example of FIG. 12, a computer system 1200 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 1200 includes an input/output (I/O) subsystem 1202 which may include a bus and/or other communication mechanism(s) for communicating information and/or instructions between the components of the computer system 1200 over electronic signal paths. The I/O subsystem 1202 may include an I/O controller, a memory controller and at least one I/O port. The electronic signal paths are represented schematically in the drawings, for example as lines, unidirectional arrows, or bidirectional arrows.

At least one hardware processor 1204 is coupled to I/O subsystem 1202 for processing information and instructions. Hardware processor 1204 may include, for example, a general-purpose microprocessor or microcontroller and/or a special-purpose microprocessor such as an embedded system or a graphics processing unit (GPU) or a digital signal processor or ARM processor. Processor 1204 may comprise an integrated arithmetic logic unit (ALU) or may be coupled to a separate ALU.

Computer system 1200 includes one or more units of memory 1206, such as a main memory, which is coupled to I/O subsystem 1202 for electronically digitally storing data and instructions to be executed by processor 1204. Memory 1206 may include volatile memory such as various forms of random-access memory (RAM) or other dynamic storage device. Memory 1206 also may be used for storing temporary variables or other intermediate information during execution of instructions to be executed by processor 1204. Such instructions, when stored in non-transitory computer-readable storage media accessible to processor 1204, can render computer system 1200 into a special-purpose machine that is customized to perform the operations specified in the instructions.

Computer system 1200 further includes non-volatile memory such as read only memory (ROM) 1208 or other static storage device coupled to I/O subsystem 1202 for storing information and instructions for processor 1204. The ROM 1208 may include various forms of programmable ROM (PROM) such as erasable PROM (EPROM) or electrically erasable PROM (EEPROM). A unit of persistent storage 1210 may include various forms of non-volatile RAM (NVRAM), such as FLASH memory, or solid-state storage, magnetic disk, or optical disk such as CD-ROM or DVD-ROM, and may be coupled to I/O subsystem 1202 for storing information and instructions. Storage 1210 is an example of a non-transitory computer-readable medium that may be used to store instructions and data which when executed by the processor 1204 cause performing computer-implemented methods to execute the techniques herein.

The instructions in memory 1206, ROM 1208 or storage 1210 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement Transmission Control Protocol/Internet Protocol (TCP/IP), Hypertext Transfer Protocol (HTTP) or other communication protocols; file processing instructions to interpret and render files coded using HTML, Extensible Markup Language (XML), Joint Photographic Experts Group (JPEG), Moving Picture Experts Group (MPEG) or Portable Network Graphics (PNG); user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 1200 may be coupled via I/O subsystem 1202 to at least one output device 1212. In one embodiment, output device 1212 is a digital computer display. Examples of a display that may be used in various embodiments include a touch screen display or a light-emitting diode (LED) display or a liquid crystal display (LCD) or an e-paper display. Computer system 1200 may include other type(s) of output devices 1212, alternatively or in addition to a display device. Examples of other output devices 1212 include printers, ticket printers, plotters, projectors, sound cards or video cards, speakers, buzzers or piezoelectric devices or other audible devices, lamps or LED or LCD indicators, haptic devices, actuators, or servos.

At least one input device 1214 is coupled to I/O subsystem 1202 for communicating signals, data, command selections or gestures to processor 1204. Examples of input devices 1214 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 1216, which may perform cursor control or other automated control functions such as navigation in a graphical interface on a display screen, alternatively or in addition to input functions. Control device 1216 may be a touchpad, a mouse, a trackball, or cursor direction keys for communicating direction information and command selections to processor 1204 and for controlling cursor movement on the output device 1212. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 1214 may include a combination of multiple different input devices, such as a video camera and a depth sensor.

In another embodiment, computer system 1200 may comprise an internet of things (IoT) device in which one or more of the output device 1212, input device 1214, and control device 1216 are omitted. Or, in such an embodiment, the input device 1214 may comprise one or more cameras, motion detectors, thermometers, microphones, seismic detectors, other sensors or detectors, measurement devices or encoders and the output device 1212 may comprise a special-purpose display such as a single-line LED or LCD display, one or more indicators, a display panel, a meter, a valve, a solenoid, an actuator or a servo.

When computer system 1200 is a mobile computing device, input device 1214 may comprise a global positioning system (GPS) receiver coupled to a GPS module that is capable of triangulating to a plurality of GPS satellites, determining and generating geo-location or position data such as latitude-longitude values for a geophysical location of the computer system 1200. Output device 1212 may include hardware, software, firmware, and interfaces for generating position reporting packets, notifications, pulse or heartbeat signals, or other recurring data transmissions that specify a position of the computer system 1200, alone or in combination with other application-specific data, directed toward host computer 1224 or server 1230.

Computer system 1200 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 1200 in response to processor 1204 executing at least one sequence of at least one instruction contained in main memory 1206. Such instructions may be read into main memory 1206 from another storage medium, such as storage 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 1210. Volatile media includes dynamic memory, such as memory 1206. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 1202. Transmission media can also take the form of acoustic or light waves, such as those generated during radio-wave and infra-red data communications.

Various forms of media may be involved in carrying at least one sequence of at least one instruction to processor 1204 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 1200 can receive the data on the communication link and convert the data to be read by computer system 1200. For instance, a receiver such as a radio frequency antenna or an infrared detector can receive the data carried in a wireless or optical signal and appropriate circuitry can provide the data to I/O subsystem 1202 such as place the data on a bus. I/O subsystem 1202 carries the data to memory 1206, from which processor 1204 retrieves and executes the instructions. The instructions received by memory 1206 may optionally be stored on storage 1210 either before or after execution by processor 1204.

Computer system 1200 also includes a communication interface 1218 coupled to I/O subsystem 1202. Communication interface 1218 provides a two-way data communication coupling to network link(s) 1220 that are directly or indirectly connected to at least one communication network, such as a network 1222 or a public or private cloud on the Internet. For example, communication interface 1218 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 1222 broadly represents a LAN, WAN, campus network, internetwork, or any combination thereof. Communication interface 1218 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1218 sends and receives electrical, electromagnetic, or optical signals over signal paths that carry digital data streams representing various types of information.

Network link 1220 typically provides electrical, electromagnetic, or optical data communication directly or through at least one network to other data devices, using, for example, satellite, cellular, Wi-Fi, or BLUETOOTH technology. For example, network link 1220 may provide a connection through a network 1222 to a host computer 1224.

Furthermore, network link 1220 may provide a connection through network 1222 or to other computing devices via internetworking devices and/or computers that are operated by an Internet Service Provider (ISP) 1226. ISP 1226 provides data communication services through a world-wide packet data communication network represented as internet 1228. A server 1230 may be coupled to internet 1228. Server 1230 broadly represents any computer, data center, virtual machine, or virtual computing instance with or without a hypervisor, or computer executing a containerized program system such as DOCKER or KUBERNETES. Server 1230 may represent an electronic digital service that is implemented using more than one computer or instance and that is accessed and used by transmitting web services requests, URL strings with parameters in HTTP payloads, application programming interface calls, app services calls, or other service calls. Computer system 1200 and server 1230 may form elements of a distributed computing system that includes other computers, a processing cluster, server farm or other organization of computers that cooperate to perform tasks or execute applications or services. Server 1230 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. Server 1230 may comprise a web application server that hosts a presentation layer, application layer and data storage layer such as a relational database system using structured query language (SQL) or NoSQL, an object store, a graph database, a flat file system or other data storage.

Computer system 1200 can send messages and receive data and instructions, including program code, through the network(s), network link 1220 and communication interface 1218. In the Internet example, a server 1230 might transmit a requested code for an application program through Internet 1228, ISP 1226, local network 1222 and communication interface 1218. The received code may be executed by processor 1204 as it is received, and/or stored in storage 1210, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 1204. While each processor 1204 or core of the processor executes a single task at a time, computer system 1200 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

5. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method of managing software distribution, comprising:
   assigning a plurality of computing devices into a plurality of batches based on a plurality of criteria, including a software environment and a virtual machine cluster;
   receiving one or more software releases;
   managing a plurality of user accounts, each identifying a respective computing device;
   for each computing device in each batch of the plurality of batches, associating a respective user account with the computing device, based on the identified respective computing device of the respective user account;
   producing a list of list records, each list record uniquely identifying:
      a particular batch of the plurality of batches,
      a particular computing device associated with the particular batch, and
      a particular user account associated with the particular computing device;
   obtaining a deployment schedule that associates each software release of the one or more software releases with a deployment date for each batch of the plurality of batches;
   generating a release scope list that indicates, for each computing device of the plurality of computing devices, an associated user account and a local deployment time from the deployment schedule;
   resolving conflicts in the deployment schedule to generate an updated deployment schedule based on the release scope list;
   deploying one or more software releases to the plurality of computing devices based on the updated deployment schedule;
   retrieving a computing device identifier for each record in the list of list records into a first sub-list;
   retrieving a particular user account identifier and a particular computing device identifier for each user account in the list of list records where the particular user account identifier is available into a second sub-list;
   removing each computing device identifier from the first sub-list which is present in the second sub-list;
   transmitting a script to a computing device in the first sub-list,
   the script instructing determining a current status of any user account logged into any computing device and a message display type based on the current status, including:
      determining whether a first user account associated with the first user account identifier is logged into a first computing device associated with the first computing device identifier, and
      when the first user account is logged in to the first computing device, causing a display of a message as a pop-up,
   the message enabling installation of a software release of the one or more software releases,
   wherein the method is performed by one or more computers.

2. The method of claim 1, further comprising:
   receiving an exception list;
   removing each list record of the list of list records where a value in the list record includes a match to an exception in the exception list.

3. The method of claim 1, further comprising:
   receiving information regarding a specific computing device;
   assigning the specific computing device to a catch-all batch of the plurality of batches;
   re-assigning the specific computing device to a specific batch of the plurality of batches based on the plurality of criteria.

4. The method of claim 1, wherein resolving conflicts in the deployment schedule to generate the updated deployment schedule based on the release scope list further comprises:
   receiving a first record including a first batch with a first deployment date;
   receiving a second record including a second batch with a second deployment date;
   transmitting the first record and the second record to an interface;
   receiving a third record including the first batch with a third deployment date;
   overwriting the first record with the third record.

5. The method of claim 1, the plurality of criteria further including a business division, geographic region, or membership of an exclusion list or an early adopter list of a computing device.

6. The method of claim 1, the script further instructing causing an email or end user communication to display when the first user account is logged into the first computing device and is associated with the first computing device according to the release scope list.

7. A system of managing software distribution, comprising:
   a memory;
   one or more processors coupled to the memory and configured to perform:
      assigning a plurality of computing devices into a plurality of batches based on a plurality of criteria, including a software environment and a virtual machine cluster;
      receiving one or more software releases;
      managing a plurality of user accounts, each identifying a respective computing device;
      for each computing device in each batch of the plurality of batches, associating a respective user account with the computing device, based on the identified respective computing device of the respective user account;
      producing a list of list records, each list record uniquely identifying:
         a particular batch of the plurality of batches,
         a particular computing device associated with the particular batch, and
         a particular user account associated with the particular computing device;

obtaining a deployment schedule that associates each software release of the one or more software releases with a deployment date for each batch of the plurality of batches;

generating a release scope list that indicates, for each computing device of the plurality of computing devices, an associated user account and a local deployment time from the deployment schedule;

resolving conflicts in the deployment schedule to generate an updated deployment schedule based on the release scope list;

deploying one or more software releases to the plurality of computing devices based on the updated deployment schedule;

retrieving a computing device identifier for each record in the list of list records into a first sub-list;

retrieving a particular user account identifier and a particular computing device identifier for each user account in the list of list records where the particular user account identifier is available into a second sub-list;

removing each computing device identifier from the first sub-list which is present in the second sub-list;

transmitting a script to a computing device in the first sub-list, the script instructing determining a current status of any user account logged into any computing device and a message display type based on the current status, including:

determining whether a first user account associated with the first user account identifier is logged into a first computing device associated with the first computing device identifier, and when the first user account is logged in to the first computing device, causing a display of a message as a pop-up, the message enabling installation of a software release of the one or more software releases.

8. The system of claim 7, the one or more processors configured to further perform:

receiving an exception list;

removing each list record of the list of list records where a value in the list record includes a match to an exception in the exception list.

9. The system of claim 7, the one or more processors configured to further perform:

receiving information regarding a specific computing device;

assigning the specific computing device to a catch-all batch of the plurality of batches;

re-assigning the specific computing device to a specific batch of the plurality of batches based on the plurality of criteria.

10. The system of claim 7, wherein resolving conflicts in the deployment schedule to generate the updated deployment schedule based on the release scope list further comprises:

receiving a first record including a first batch with a first deployment date;

receiving a second record including a second batch with a second deployment date;

transmitting the first record and the second record to an interface;

receiving a third record including the first batch with a third deployment date;

overwriting the first record with the third record.

11. One or more computer-readable, non-transitory storage media storing instructions which when executed cause one or more processors to perform:

assigning a plurality of computing devices into a plurality of batches based on a plurality of criteria, including a software environment and a virtual machine cluster;

receiving one or more software releases;

managing a plurality of user accounts, each identifying a respective computing device;

for each computing device in each batch of the plurality of batches, associating a respective user account with the computing device, based on the identified respective computing device of the respective user account;

producing a list of list records, each list record uniquely identifying:

a particular batch of the plurality of batches, a particular computing device associated with the particular batch, and a particular user account associated with the particular computing device;

obtaining a deployment schedule that associates each software release of the one or more software releases with a deployment date for each batch of the plurality of batches;

generating a release scope list that indicates, for each computing device of the plurality of computing devices, an associated user account and a local deployment time from the deployment schedule;

resolving conflicts in the deployment schedule to generate an updated deployment schedule based on the release scope list;

deploying one or more software releases to the plurality of computing devices based on the updated deployment schedule;

retrieving a computing device identifier for each record in the list of list records into a first sub-list;

retrieving a particular user account identifier and a particular computing device identifier for each user account in the list of list records where the particular user account identifier is available into a second sub-list;

removing each computing device identifier from the first sub-list which is present in the second sub-list;

transmitting a script to a computing device in the first sub-list, the script instructing determining a current status of any user account logged into any computing device and a message display type based on the current status, including:

determining whether a first user account associated with the first user account identifier is logged into a first computing device associated with the first computing device identifier, and when the first user account is logged in to the first computing device, causing a display of a message as a pop-up, the message enabling installation of a software release of the one or more software releases.

12. The one or more computer-readable, non-transitory storage media of claim 11, the instructions when executed cause the one or more processors to further perform:

receiving information regarding a specific computing device;

assigning the specific computing device to a catch-all batch of the plurality of batches;

re-assigning the specific computing device to a specific batch of the plurality of batches based on the plurality of criteria.

13. The one or more computer-readable, non-transitory storage media of claim 11, wherein resolving conflicts in the deployment schedule to generate the updated deployment schedule based on the release scope list further comprises:
receiving a first record including a first batch with a first deployment date;
receiving a second record including a second batch with a second deployment date;
transmitting the first record and the second record to an interface;
receiving a third record including the first batch with a third deployment date;
overwriting the first record with the third record.

14. The one or more computer-readable, non-transitory storage media of claim 11, the plurality of criteria further including a business division, geographic region, or membership of an exclusion list or an early adopter list of a computing device.

15. The one or more computer-readable, non-transitory storage media of claim 11, the script further instructing causing an email or end user communication to display when the first user account is logged into the first computing device and is associated with the first computing device according to the release scope list.

* * * * *